United States Patent
Xu et al.

(10) Patent No.: US 12,325,789 B2
(45) Date of Patent: Jun. 10, 2025

(54) PREPARATION METHOD OF FLUOROPOLYMER PROCESSING AID

(71) Applicant: ZHEJIANG JAVA SPECIALTY CHEMICALS CO., LTD, Shaoxing (CN)

(72) Inventors: Liqun Xu, Shaoxing (CN); Xianfu Yi, Shaoxing (CN); Wenping Peng, Shaoxing (CN); Shuangbin Chen, Shaoxing (CN); Liuwen Tang, Shaoxing (CN); Hanchao Zhao, Shaoxing (CN); Liyong Qiu, Shaoxing (CN)

(73) Assignee: ZHEJIANG JAVA SPECIALTY CHEMICALS CO., LTD, Shaoxing (CN)

( * ) Notice: Subject to any disclaimer, the term of this patent is extended or adjusted under 35 U.S.C. 154(b) by 547 days.

(21) Appl. No.: 17/773,613

(22) PCT Filed: Dec. 2, 2020

(86) PCT No.: PCT/CN2020/133457
§ 371 (c)(1),
(2) Date: May 1, 2022

(87) PCT Pub. No.: WO2021/129336
PCT Pub. Date: Jul. 1, 2021

(65) Prior Publication Data
US 2022/0380588 A1 Dec. 1, 2022

(30) Foreign Application Priority Data
Dec. 26, 2019 (CN) .......................... 201911363530.1

(51) Int. Cl.
| | | |
|---|---|---|
| *C08L 27/12* | (2006.01) | |
| *C08G 63/08* | (2006.01) | |
| *C08G 63/82* | (2006.01) | |
| *C08G 63/85* | (2006.01) | |
| *C08J 3/12* | (2006.01) | |

(52) U.S. Cl.
CPC .............. *C08L 27/12* (2013.01); *C08G 63/08* (2013.01); *C08G 63/823* (2013.01); *C08G 63/85* (2013.01); *C08J 3/12* (2013.01); *C08L 2203/30* (2013.01); *C08L 2205/06* (2013.01)

(58) Field of Classification Search
CPC .......... C08L 27/12; C08L 67/04; C08L 27/16; C08L 23/0815; C08G 63/823; C08G 63/08; C08J 2427/16; C08J 2367/04
See application file for complete search history.

(56) References Cited

U.S. PATENT DOCUMENTS

2008/0097034 A1  4/2008  Ho et al.

FOREIGN PATENT DOCUMENTS

| CN | 102428140 A | 4/2012 |
| CN | 102482374 A | 5/2012 |
| CN | 104371227 A | 2/2015 |
| CN | 107586389 A | 1/2018 |
| CN | 11087582 A | 5/2020 |

*Primary Examiner* — Mark S Kaucher
(74) *Attorney, Agent, or Firm* — Global IP Services; Tianhua Gu

(57) ABSTRACT

A preparation method of a fluoropolymer processing aid. The preparation method comprises the following steps: simultaneously adding ε-caprolactone and a fluoropolymer elastomer into a reactor, and heating to completely dissolve the fluoropolymer elastomer; and then cooling, adding polyol, mixing thoroughly, and adding an organotin catalyst to carry out a polymerization reaction; and after the reaction is finished, carrying out cooling, pulverizing or spray granulation so as to obtain the fluoropolymer processing aid. The processing aid prepared by using the method can reduce the extrusion pressure of a polymer during extrusion, improve the processing efficiency, improve the phenomena of melt rupture and "sharkskin" during polymer extrusion, and effectively enhance the surface quality of a product. Compared with the prior art, the processing aid of the invention has the characteristics of uniform dispersed particle size during polymer processing, no coking at a die head during long-time polymer extrusion processing, etc.

13 Claims, No Drawings

PREPARATION METHOD OF FLUOROPOLYMER PROCESSING AID

CROSS REFERENCE TO RELATED PATENT APPLICATION

The present application is the US national stage of PCT/CN2020/133457 filed on 2020 Dec. 2, which claims the priority of the Chinese patent application No. 201911363530.1 filed on 2019 Dec. 26, which application is incorporated herein by reference.

BACKGROUND OF THE INVENTION

1. Technical Field

The present invention relates to the field of polymer processing aids, and in particular to a preparation method of a fluoropolymer processing aid.

2. Description of Related Art

While satisfying the mechanical properties of products, plastic products often encounter some problems during the extrusion and molding process. These problems include: polymer accumulation at the orifice of the die head (called die plateout or die drool), high back pressure during the extrusion process, and excessive polymer degradation or low melt strength due to a high extrusion temperature. These problems slow down the extrusion process, or the process must be stopped to clean the equipment.

Fluoropolymer processing aids can solve these problems. The principle is to use a fluorine compound with extremely low surface energy, and the fluorine compound can reduce the internal friction between the processed resin molecules in plastic processing, and increase the melting rate and melt deformability to improve the overall plasticizing effect; moreover, the fluorine compound has extremely low solubility in the processed resin and is incompatible with the matrix resin; it exudes from the melt to the surface of the melt during processing, forming an isolation layer on the metal surface of the processing equipment, reducing the adhesion of the melt to the body and the metal surface of the die, reducing the friction between the melt and the device wall during the movement, and improving the uneven movement of the melt during the processing, thereby improving the resin processing performance, product quality, energy consumption, production efficiency, and mechanical wear to varying degrees.

In the prior art, fluoropolymer processing aids can be obtained by compounding polyethylene glycol, polycaprolactone and fluoropolymer. For example, in the U.S. Pat. No. 4,855,360, fluoropolymer processing aids were obtained by compounding polyethylene glycol with a number average molecular weight of 1,000 to 20,000 and a fluoropolymer; in Chinese Patent CN102428140A, fluoropolymer processing aids were obtained by compounding polycaprolactone, polyalkylene oxide and fluoropolymer. Although these aids are more effective, they can shorten and eliminate the time required for melt fracture of the extrudable composition. However, on one hand, because the fluoropolymer needs to be pulverized into particles at a low temperature during compounding, it is difficult for the pulverized particles to reach a particle size of less than 10 μm, and the compounded product is likely to agglomerate and easily causes uneven dispersion during application, resulting in instability of the processing process; on the other hand, low molecular weight polyethylene glycol is easily subjected to thermally induced oxidation and decomposition, resulting in coking at the die. Therefore, a novel preparation process is needed to solve the current problems of uneven dispersion and thermally induced oxidation and decomposition of fluoropolymers.

SUMMARY OF THE INVENTION

In view of the shortcomings of the prior art, the invention provides a preparation method of a fluoropolymer processing aid. The fluoropolymer prepared by the preparation method has good dispersibility and excellent high-temperature resistance.

In order to solve the above technical problems, the present invention adopts the following technical solution:

A preparation method of a fluoropolymer processing aid, comprising the following steps:

(1) simultaneously adding ε-caprolactone and a fluoropolymer elastomer into a reactor, and heating to completely dissolve the fluoropolymer elastomer; and (2) then, cooling to a temperature between 120° C. and 170° C., adding polyol, mixing thoroughly, controlling the temperature between 120° C. and 170° C., and adding an organotin catalyst to carry out a polymerization reaction (1 h-5 h); and after the reaction is finished, carrying out cooling, pulverizing or spray granulation so as to obtain the fluoropolymer processing aid.

As a preferred technical solution, the fluoropolymer elastomer contains copolymerized units selected from: ① vinylidene fluoride and hexafluoropropylene; ② vinylidene fluoride, hexafluoropropylene, and tetrafluoroethylene; ③ tetrafluoroethylene and propylene; and ④ tetrafluoroethylene, vinylidene fluoride, and propylene.

As a preferred technical solution, the fluoropolymer elastomer is a copolymer of vinylidene fluoride and hexafluoropropylene.

As a preferred technical solution, the Mooney viscosity ML(1+10) of the fluoropolymer elastomer at 121° C. is 30-80, more preferably 50-80.

As a preferred technical solution, the ε-caprolactone has a purity of 99.0% or above and a water content of 200 PPM or below.

As a preferred technical solution, in Step (1), the mass ratio of the ε-caprolactone to the fluoropolymer elastomer is (4-20):3.

As a preferred technical solution, in Step (1), the dissolution temperature during the heating dissolution is between 160° C. and 220° C.; the temperature holding time during the heating dissolution is between 1 h and 5 h.

As a preferred technical solution, in Step (2), the molar ratio of the ε-caprolactone to the polyol is (5-80):1.

As a preferred technical solution, in Step (2), the polyhydric alcohol is a dihydric alcohol or a trihydric alcohol.

As a preferred technical solution, the dihydric alcohol is a dihydric alcohol with 2 to 18 carbon atoms or a polyethylene glycol with a molecular weight of 200 to 8000; more preferably, the dihydric alcohol is ethylene glycol, propylene glycol, butylene glycol, pentylene glycol, hexylene glycol, or polyethylene glycol with a molecular weight of 200 to 2000.

As a preferred technical solution, the trihydric alcohol is glycerol or trimethylolpropane and its derivatives.

As a preferred technical solution, in Step (2), the catalyst is a mixture of one or more of dibutyltin dilaurate, stannous isooctanoate, and dibutyltin dodecylsulfide.

As a preferred technical solution, in Step (2), the mass ratio of the ε-caprolactone to the organotin catalyst is (200-1000):1.

The present invention has the following beneficial effects:

Compared with the existing fluoropolymer processing aids, the processing aid prepared by the invention has the advantages of good dispersibility, excellent high temperature resistance, and low coking at the die head when applied to polymer extrusion processing for a long time. According to the invention, the fluoropolymer elastomer is dissolved under a high temperature to obtain fine particles, and the prepared processing aid particles are small in size. In addition, the invention adopts the synthesis of polycaprolactone in the fluoropolymer elastomer in-situ system, and the prepared processing aid has significantly improved temperature resistance as compared with the existing fluoropolymer processing aids.

The fluoropolymer processing aid prepared by the invention is made from ε-caprolactone and fluoropolymer elastomer. With the help of the flexibility and excellent processing improvement characteristics of fluorine compounds, the prepared fluoropolymer processing aid added into a plastic matrix can effectively solve the time-consuming problem in the formation of the lubricating layer during plastic extrusion.

After being added to the plastic matrix, the fluoropolymer processing aid prepared by the invention can eliminate the surface defects of the product, eliminate sharkskin, improve the impact strength of the product, improve the surface gloss of the product, and improve the quality of the product; it can effectively reduce the extrusion pressure during plastic processing, thereby reducing energy consumption, reducing mechanical wear, and reducing the overall cost of film processing. Under the same product quality and energy consumption conditions, the fluoropolymer processing aid can improve the production efficiency by 20%-40%; it can also reduce die plateout and reduce the phenomenon of uneven film thickness. The fluoropolymer processing aid can reduce the generation of gel in the melt, reduce crystal points, and improve the quality of film products.

DETAILED DESCRIPTION OF THE INVENTION

The invention will be further explained by the following embodiments. The embodiments are only used to explain the invention and do not constitute any limitation to the invention.

EXAMPLE 1

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML (1+10) is 50) into a reactor, heating to dissolve the fluoropolymer elastomer, controlling the temperature between 205° C. and 210° C. and holding the temperature for 2 h so that the fluoropolymer elastomer is completely dissolved, thus obtaining a fluoropolymer elastomer solution; and (2) cooling the fluoropolymer elastomer solution to 140° C., then adding 30 g (0.48 mol) of ethylene glycol, stirring and mixing thoroughly, adding 4 g of stannous isooctanoate, controlling the temperature between 140° C. and 150° C. and holding the temperature to react for 2-3 h; after the reaction is completed, carrying out granulation by a rotary steel belt cooling granulator to obtain the fluoropolymer processing aid.

EXAMPLE 2

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 50) into a reactor, heating to dissolve the fluoropolymer elastomer, controlling the temperature between 205° C. and 210° C. and holding the temperature for 3 h so that the fluoropolymer elastomer is completely dissolved, thus obtaining a fluoropolymer elastomer solution; and (2) cooling the fluoropolymer elastomer solution to a temperature between 120° C. and 130° C., then adding 30 g (0.39 mol) of propylene glycol, mixing thoroughly, adding 2 g of stannous isooctanoate, controlling the temperature between 120° C. and 130° C. and holding the temperature to react for 5 h; after the reaction is completed, carrying out granulation by a rotary steel belt cooling granulator to obtain the fluoropolymer processing aid.

EXAMPLE 3

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 50) into a reactor, heating to dissolve the fluoropolymer elastomer, controlling the temperature between 205° C. and 210° C. and holding the temperature for 2 h so that the fluoropolymer elastomer is completely dissolved, thus obtaining a fluoropolymer elastomer solution; and (2) cooling the fluoropolymer elastomer solution to a temperature between 160° C. and 170° C., then adding 30 g (0.33 mol) of butylene glycol, mixing thoroughly, adding 3 g of stannous isooctanoate, controlling the temperature between 160° C. and 170° C. and holding the temperature to react for 2-3 h; after the reaction is completed, carrying out granulation by a rotary steel belt cooling granulator to obtain the fluoropolymer processing aid.

EXAMPLE 4

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 50) into a reactor, heating to dissolve the fluoropolymer elastomer, controlling the temperature between 180° C. and 190° C. and holding the temperature for 2 h so that the fluoropolymer elastomer is completely dissolved, thus obtaining a fluoropolymer elastomer solution; and (2) cooling the fluoropolymer elastomer solution to a temperature between 120° C. and 130° C., then adding 30 g (0.288 mol) of pentylene glycol, mixing thoroughly, adding 4 g of stannous isooctanoate, controlling the temperature between 120° C. and 130° C. and holding the temperature to react for 5 h; after the reaction is completed, carrying out granulation by a rotary steel belt cooling granulator to obtain the fluoropolymer processing aid.

EXAMPLE 5

A preparation method of a fluoropolymer processing aid, comprising the following steps:

(1) simultaneously adding 1.4 kg (12.26 mol) of ε-caprolactone and 0.4 kg of a fluoropolymer elastomer (3F® FE2601, produced by Shanghai Sanaifu New Material Technology Co., Ltd., Mooney viscosity (121° C., ML(1+10) is 50) into a reactor, heating to dissolve the fluoropolymer elastomer, controlling the temperature between 180° C. and 190° C. and holding the temperature for 2 h so that the fluoropolymer elastomer is completely dissolved, thus obtaining a fluoropolymer elastomer solution; and (2) cooling the fluoropolymer elastomer solution to a temperature between 130° C. and 140° C., then adding 30 g (0.25 mol) of hexylene glycol, mixing thoroughly, adding 3 g of stannous isooctanoate, controlling the temperature between 130° C. and 140° C. and holding the temperature to react for 2-3 h; after the reaction is completed, carrying out granulation by a rotary steel belt cooling granulator to obtain the fluoropolymer processing aid.

EXAMPLE 6

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 55) into a reactor, heating to dissolve the fluoropolymer elastomer, controlling the temperature between 190° C. and 200° C. and holding the temperature for 3 h so that the fluoropolymer elastomer is completely dissolved, thus obtaining a fluoropolymer elastomer solution; and (2) cooling the fluoropolymer elastomer solution to a temperature between 150° C. and 170° C., then adding 34.2 g (0.55 mol) of polyethylene glycol (Mw=200), stirring and mixing thoroughly, adding 4 g of stannous isooctanoate, controlling the temperature between 150° C. and 170° C. and holding the temperature to react for 2 h; after the reaction is completed, carrying out granulation by a rotary steel belt cooling granulator to obtain the fluoropolymer processing aid.

EXAMPLE 7

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 55) into a reactor, heating to dissolve the fluoropolymer elastomer, controlling the temperature between 170° C. and 180° C. and holding the temperature for 4 h so that the fluoropolymer elastomer is completely dissolved, thus obtaining a fluoropolymer elastomer solution; and (2) cooling the fluoropolymer elastomer solution to a temperature between 140° C. and 150° C., then adding 42.0 g (0.55 mol) of propylene glycol, stirring and mixing thoroughly, adding 3 g of stannous isooctanoate, controlling the temperature between 140° C. and 150° C. and holding the temperature to react for 3 h; after the reaction is completed, carrying out granulation by a rotary steel belt cooling granulator to obtain the fluoropolymer processing aid.

EXAMPLE 8

A preparation method of a fluoropolymer processing aid, comprising the following steps:

(1) simultaneously adding 1.4 kg (12.26 mol) of ε-caprolactone and 0.5 kg of a fluoropolymer elastomer (3F® FE2601, produced by Shanghai Sanaifu New Material Technology Co., Ltd., Mooney viscosity (121° C., ML(1+10) is 55) into a reactor, heating to dissolve the fluoropolymer elastomer, controlling the temperature between 190° C. and 200° C. and holding the temperature for 3 h so that the fluoropolymer elastomer is completely dissolved, thus obtaining a fluoropolymer elastomer solution; and (2) cooling the fluoropolymer elastomer solution to a temperature between 130° C. and 140° C., then adding 33.1 g (0.367 mol) of propylene glycol, stirring and mixing thoroughly, adding 5.5 g of stannous isooctanoate, controlling the temperature between 140° C. and 150° C. and holding the temperature to react for 2 h; after the reaction is completed, carrying out granulation by a rotary steel belt cooling granulator to obtain the fluoropolymer processing aid.

EXAMPLE 9

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (121° C., ML(1+10) is 55) into a reactor, heating to dissolve the fluoropolymer elastomer, controlling the temperature between 190° C. and 200° C. and holding the temperature for 2 h so that the fluoropolymer elastomer is completely dissolved, thus obtaining a fluoropolymer elastomer solution; and (2) cooling the fluoropolymer elastomer solution to a temperature between 130° C. and 140° C., then adding 38.3 g (0.367 mol) of pentylene glycol, stirring and mixing thoroughly, adding 4.5 g of stannous isooctanoate, controlling the temperature between 130° C. and 140° C. and holding the temperature to react for 2 h; after the reaction is completed, carrying out granulation by a rotary steel belt cooling granulator to obtain the fluoropolymer processing aid.

EXAMPLE 10

A preparation method of a fluoropolymer processing aid, comprising the following steps:

(1) simultaneously adding 1.4 kg (12.26 mol) of ε-caprolactone and 0.6 kg of a fluoropolymer elastomer (3F® FE2601, produced by Shanghai Sanaifu New Material Technology Co., Ltd., Mooney viscosity (12° C., ML(1+10) is 55) into a reactor, heating to dissolve the fluoropolymer elastomer, controlling the temperature between 190° C. and 200° C. and holding the temperature for 3 h so that the fluoropolymer elastomer is completely dissolved, thus obtaining a fluoropolymer elastomer solution; and (2) cooling the fluoropolymer elastomer solution to a temperature between 140° C. and 150° C., then dropwise adding 29.0 g (0.245 mol) of hexylene glycol, stirring and mixing thoroughly, adding 5 g of stannous isooctanoate, controlling the temperature between 140° C. and 150° C. and holding the temperature to react for 2 h; after the reaction is completed, carrying out granulation by a rotary steel belt cooling granulator to obtain the fluoropolymer processing aid.

APPLICATION EXAMPLE

The fluoropolymer processing aids prepared in the above-mentioned Examples 1 to 10 and PPA-Control 1 were used in the metallocene resin system. The formula is shown in Table 1. Among them, the processing aids used in PPA-Control 1 was Dynamar®FX-5920 (produced by 3M Innovation Co., Ltd.); the metallocene resin used was metallocene HPR1018 (Dushanzi Petrochemical Company);

TABLE 1

| Raw material | 1# | 2# | 3# | 4# | 5# | 6# | 7# | 8# | 9# | 10# | 11# | 12# |
|---|---|---|---|---|---|---|---|---|---|---|---|---|
| Metallocene resin | 95 | 95 | 95 | 95 | 95 | 95 | 95 | 95 | 95 | 95 | 100 | 95 |
| Example 1 | 5 | | | | | | | | | | | |
| Example 2 | | 5 | | | | | | | | | | |
| Example 3 | | | 5 | | | | | | | | | |
| Example 4 | | | | 5 | | | | | | | | |
| Example 5 | | | | | 5 | | | | | | | |
| Example 6 | | | | | | 5 | | | | | | |
| Example 7 | | | | | | | 5 | | | | | |
| Example 8 | | | | | | | | 5 | | | | |
| Example 9 | | | | | | | | | 5 | | | |
| Example 10 | | | | | | | | | | 5 | | |
| Blank sample | | | | | | | | | | | 0 | |
| PPA-Control 1 | | | | | | | | | | | | 5 |

The specific preparation method comprises: mixing the metallocene resin and the fluoropolymer processing aid in a high-speed mixer at a speed of 600 rpm for 2 minutes, thus obtaining a mixture; carrying out melt extrusion and granulation on the mixture through a twin-screw extruder with a length-diameter ratio of 42:1, wherein the process parameters are as follows: temperatures are 180° C. in the first zone, 190° C. in the second zone, 190° C. in the third zone, and 200° C. in the fourth zone to the eleven-th zone, the head temperature is 210° C., the screw speed is 200 r/min, the feeding frequency is 20-25 Hz, the melt pressure is 3.0 MPa, and the vacuum degree is −0.06 MPa; and after extrusion granulation, drying the obtained particles in an oven at 100° C. for 2 h to prepare samples, denoted as 1 #, 2 #, 3 #, 4 #, 5 #, 6 #, 7 #, 8 #, 9 #10 #, 11 #, and 12 #, respectively; wherein the load of the granulator and die head pressure are monitored during extrusion granulation, and the obtained samples are subjected to particle size analysis using a KYKY-EM8000F scanning electron microscope.

TABLE 2

| Sample | Die head pressure (MPa) | Load (%) | Particle size (μm) |
|---|---|---|---|
| 1# | 2.7-2.8 | 48.3-49.3 | 1-4 |
| 2# | 2.6-2.8 | 47.8-48.5 | 1-4 |
| 3# | 2.8-2.9 | 48.2-48.3 | 1-5 |
| 4# | 2.8 | 48.3-48.9 | 1-6 |
| 5# | 2.8 | 47.9-48.2 | 1-6 |
| 6# | 2.7-2.9 | 49-49.3 | 1-4 |
| 7# | 2.6-2.7 | 46.8-47.4 | 1-4 |

TABLE 2-continued

| Sample | Die head pressure (MPa) | Load (%) | Particle size (μm) |
|---|---|---|---|
| 8# | 2.7 | 47.2-47.9 | 1-5 |
| 9# | 2.8 | 48.0-49.2 | 1-6 |
| 10# | 2.7-2.9 | 48.9-50.1 | 1-5 |
| Blank sample | 3.2-3.5 | 51-52.6 | — |
| PPA-Control 1 | 3.0-3.2 | 50-51.7 | 1-10 |

It can be seen from the test results in Table 2 that in the metallocene resin system of the fluoropolymer processing aid prepared by the present invention, each experimental group has a smaller particle size than the control sample and is dispersed uniformly. Compared with the control sample, after the fluoropolymer processing aids were added the pressure and load of the die head dropped significantly. Compared with the blank sample and the control sample, the experimental group achieves more obvious effect. Reason analysis: the fluoropolymer processing aid can form a low surface energy polymer "coating" structure in the base resin, so that the processed polymer slides smoothly across the interface and the shear stress is significantly reduced during processing, thereby reducing energy consumption, reducing mechanical wear, and reducing the overall cost of film processing.

2% of the above-prepared samples were added to the metallocene resin to have a film blowing test using an SCM-25 film blowing machine, where the film thickness was 0.05 mm and the film width was 90 mm. The processing parameters of the film blowing machine during film blowing and status during sample processing were observed. The results are shown in Table 3:

TABLE 3

| Sample No. | Die head pressure (MPa) | Host current (A) | Pulling speed (m/min) | Melt temperature (° C.) | Film blowing time (h) | Die coking status |
|---|---|---|---|---|---|---|
| 1# | 0.69 | 6.1 | 4.5 | 201 | 48 | No coking |
| 2# | 0.71 | 6.0 | 4.4 | 202 | 48 | No coking |
| 3# | 0.72 | 6.2 | 4.5 | 201 | 48 | No coking |
| 4# | 0.71 | 6.1 | 4.6 | 203 | 48 | No coking |
| 5# | 0.68 | 5.7 | 4.7 | 203 | 48 | No coking |
| 6# | 0.69 | 5.8 | 4.6 | 202 | 48 | No coking |
| 7# | 0.70 | 6.0 | 4.4 | 201 | 48 | No coking |
| 8# | 0.72 | 6.1 | 4.7 | 202 | 48 | No coking |

TABLE 3-continued

| Sample No. | Die head pressure (MPa) | Host current (A) | Pulling speed (m/min) | Melt temperature (° C.) | Film blowing time (h) | Die coking status |
|---|---|---|---|---|---|---|
| 9# | 0.71 | 5.9 | 4.6 | 203 | 48 | No coking |
| 10# | 0.74 | 6.3 | 4.6 | 203 | 48 | No coking |
| Blank sample | 0.80 | 6.6 | 4.6 | 201 | 48 | Little |
| PPA-Control 1 | 0.76 | 6.2 | 4.7 | 203 | 48 | The coking is obvious. |

It can be seen from the test results in Table 3 that when the fluoropolymer processing aid prepared by the invention is used for the film blowing test in the metallocene resin system, compared with the blank sample and the control sample, each experimental group, after being added with the masterbatch, has significantly decreased die head pressure and host current and improved die coking status. Compared with the control group, the experimental groups have more obvious improvement effect. Reason analysis shows that the fluoropolymer processing aid improves the processing rheology of low melt flow index resins. During the processing of low melt flow index resins, due to the high melt viscosity, the screw torque increases and the pressure in the barrel increases, which requires the processing temperature of the plastic to be increased, thus increasing the processing difficulty. The use of the fluoropolymer processing aid developed by the invention can properly solve these problems.

The film samples obtained by the above-mentioned film blowing processing were subjected to performance test, and the tensile strength and the tensile breaking stress were tested according to the standard GB-6672. The light transmittance was tested according to the standard GB/T2410-2008. The test results are shown in Table 4:

TABLE 4

| Sample No. | Tensile strength (MPa) | | Tensile breaking stress (MPa) | | Light transmittance (%) |
|---|---|---|---|---|---|
| | Longitudinal | Transverse | Longitudinal | Transverse | |
| 1# | 39.3 | 32.5 | 38.9 | 32.1 | 92 |
| 2# | 38.9 | 32.3 | 37.5 | 32.0 | 92.6 |
| 3# | 39.9 | 32.9 | 39.0 | 31.8 | 91.9 |
| 4# | 40.1 | 31.7 | 39.5 | 31.0 | 92.3 |
| 5# | 40.3 | 31.0 | 39.2 | 30.7 | 92.1 |
| 6# | 39.8 | 32.4 | 39.2 | 31.1 | 93.0 |
| 7# | 40.0 | 32.0 | 39.0 | 31.0 | 93.1 |
| 8# | 39.5 | 32.6 | 38.4 | 31.6 | 93 |
| 9# | 39.7 | 32.2 | 39.1 | 31.2 | 92.9 |
| 10# | 40.2 | 31.9 | 38.9 | 30.9 | 92.6 |
| Blank sample | 35 | 32.1 | 34.8 | 30.6 | 90 |
| PPA-Control 1 | 36.7 | 31.8 | 36.7 | 31.7 | 92.5 |

It can be seen from Table 4 that in the experimental groups using the masterbatch of the invention, the film products obtained by adding the masterbatch to the metallocene resin to perform film blowing; the longitudinal tensile strength performance of the experimental groups is significantly better than that of the control group, and the experimental groups and the control groups are at the same level in term of the transverse tensile strength performance. In terms of light transmittance, the experimental groups using the masterbatch of the invention are higher than the blank sample and the control sample. The reason analysis shows that the fluoropolymer processing aid improves the surface smoothness of the film without affecting the transparency, light transmittance, and haze of the product, and improves the tensile strength and quality of the product.

Although specific embodiments of the invention have been described, many other forms and modifications of the invention will be apparent to those skilled in the art. It should be understood that the appended claims and the invention generally cover all such obvious forms and changes within the true spirit and scope of the invention.

What is claimed is:

1. A preparation method of a fluoropolymer processing aid, comprising the following steps:
   (1) simultaneously adding ε-caprolactone and a fluoropolymer elastomer into a reactor, and heating to completely dissolve the fluoropolymer elastomer; and
   (2) then, cooling to a temperature between 120° C. and 170° C., adding polyol, mixing thoroughly, controlling the temperature between 120° C. and 170° C., and adding an organotin catalyst to carry out a polymerization reaction (1 h-5 h); and after the reaction is finished, carrying out cooling, pulverizing or spray granulation so as to obtain the fluoropolymer processing aid.

2. The preparation method of a fluoropolymer processing aid according to claim 1, wherein the fluoropolymer elastomer contains copolymerized units selected from: ① vinylidene fluoride and hexafluoropropylene; ② vinylidene fluoride, hexafluoropropylene, and tetrafluoroethylene; ③ tetrafluoroethylene and propylene; and ④ tetrafluoroethylene, vinylidene fluoride, and propylene.

3. The preparation method of a fluoropolymer processing aid according to claim 2, wherein the fluoropolymer elastomer is a copolymer of vinylidene fluoride and hexafluoropropylene.

4. The preparation method of a fluoropolymer processing aid according to claim 1, wherein the Mooney viscosity ML(1+10) of the fluoropolymer elastomer at 121° C. is 30-80.

5. The preparation method of a fluoropolymer processing aid according to claim 1, wherein the ε-caprolactone has a purity of 99.0% or above and a water content of 200 PPM or below.

6. The preparation method of a fluoropolymer processing aid according to claim 1, wherein in Step (1), the mass ratio of the ε-caprolactone to the fluoropolymer elastomer is (4-20):3.

7. The preparation method of a fluoropolymer processing aid according to claim 1, wherein in Step (1), the dissolution temperature during the heating dissolution is between 160° C. and 220° C.; the temperature holding time during the heating dissolution is between 1 h and 5 h.

8. The preparation method of a fluoropolymer processing aid according to claim 1, wherein in Step (2), the molar ratio of the ε-caprolactone to the polyol is (5-80):1.

9. The preparation method of a fluoropolymer processing aid according to claim 1, wherein in Step (2), the polyhydric alcohol is a dihydric alcohol or a trihydric alcohol.

10. The preparation method of a fluoropolymer processing aid according to claim 9, wherein the dihydric alcohol is a dihydric alcohol with 2 to 18 carbon atoms or a polyethylene glycol with a molecular weight of 200 to 8000.

11. The preparation method of a fluoropolymer processing aid according to claim 9, wherein the trihydric alcohol is glycerol or trimethylolpropane and its derivatives.

12. The preparation method of a fluoropolymer processing aid according to claim 1, wherein in Step (2), the catalyst is a mixture of one or more of dibutyltin dilaurate, stannous isooctanoate, and dibutyltin dodecylsulfide.

13. The preparation method of a fluoropolymer processing aid according to claim 1, wherein in Step (2), the mass ratio of the ε-caprolactone to the organotin catalyst is (200-1000): 1.

* * * * *